United States Patent
Zoia et al.

(10) Patent No.: US 11,814,027 B2
(45) Date of Patent: Nov. 14, 2023

(54) FUEL REACTANT LEAK DETECTION SYSTEM AND METHOD OF DETECTING FUEL REACTANT LEAKS

(71) Applicant: Toyota Motor Engineering & Manufacturing North America, Inc, Plano, TX (US)

(72) Inventors: Giorgio L Zoia, Los Angeles, CA (US); Takehito Yokoo, Mission Viejo, CA (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 0 days.

(21) Appl. No.: 17/665,100

(22) Filed: Feb. 4, 2022

(65) Prior Publication Data

US 2023/0249672 A1     Aug. 10, 2023

(51) Int. Cl.
*B60W 20/50* (2016.01)
*B60W 10/06* (2006.01)
(Continued)

(52) U.S. Cl.
CPC ............ *B60W 20/50* (2013.01); *B60W 10/06* (2013.01); *B60W 10/08* (2013.01); *B60W 20/16* (2016.01);
(Continued)

(58) Field of Classification Search
CPC ...... B60W 20/50; B60W 10/06; B60W 10/08; B60W 20/16; B60W 50/0205; B60W 2050/0297; B60W 2510/0638; B60W 2510/0657; B60W 2710/0644; B60W 2710/0666; F02D 41/0037; F02M 25/0809; F02M 2025/0845; B60Y 2200/92

See application file for complete search history.

(56) References Cited

U.S. PATENT DOCUMENTS

| | | |
|---|---|---|
| 7,171,989 B2 | 2/2007 | Corless et al. |
| 9,293,774 B2 | 3/2016 | Asano et al. |

(Continued)

FOREIGN PATENT DOCUMENTS

| | | |
|---|---|---|
| DE | 102013225792 A1 | 6/2015 |
| JP | 6819303 B2 | 7/2018 |
| KR | 20110072874 A1 | 6/2011 |

*Primary Examiner* — Phutthiwat Wongwian
*Assistant Examiner* — Susan E Scharpf
(74) *Attorney, Agent, or Firm* — Jordan IP Law LLC

(57) ABSTRACT

A vehicle, a vehicle fuel reactant leak detection system, a computer program product, and a computer implemented method of detecting leakage of a fuel reactant from a vehicle. The vehicle includes one or more fuel cell modules, a fuel supply source to supply a fuel reactant to the one or more fuel cell modules via a high-pressure fuel supply line, a fuel supply valve configured to open and close fuel reactant flow through the high-pressure fuel supply line, and a computing device, operatively connected to the fuel supply source. The computing device includes one or more processors caused to conduct, in response to a detection as sensor data of pressure in the high-pressure fuel supply line when the vehicle engine is in a non-operating state, fuel pressure analysis of the sensor data, and detect, based on the fuel pressure analysis, leakage of the fuel reactant at the fuel supply valve.

12 Claims, 6 Drawing Sheets

(51) Int. Cl.
  *B60W 10/08* (2006.01)
  *B60W 20/16* (2016.01)
  *B60W 50/02* (2012.01)
  *F02D 41/00* (2006.01)
  *F02M 25/08* (2006.01)
  *B60W 50/029* (2012.01)

(52) U.S. Cl.
  CPC ..... *B60W 50/0205* (2013.01); *F02D 41/0037* (2013.01); *F02M 25/0809* (2013.01); *B60W 2050/0297* (2013.01); *B60W 2510/0638* (2013.01); *B60W 2510/0657* (2013.01); *B60W 2710/0644* (2013.01); *B60W 2710/0666* (2013.01); *B60Y 2200/92* (2013.01); *F02M 2025/0845* (2013.01)

(56) References Cited

U.S. PATENT DOCUMENTS

| | | | |
|---|---|---|---|
| 9,976,523 | B2 | 5/2018 | Sarikaya et al. |
| 2007/0082240 | A1* | 4/2007 | Fujita ................ H01M 8/04664 429/444 |
| 2007/0207355 | A1* | 9/2007 | Yoshida ............ H01M 8/04679 429/444 |
| 2008/0003471 | A1* | 1/2008 | Beliveau ........... H01M 8/04776 429/513 |
| 2008/0096057 | A1* | 4/2008 | Bono ................ H01M 8/04425 429/513 |
| 2009/0035612 | A1* | 2/2009 | Suematsu ........... H01M 16/006 429/432 |
| 2018/0326974 | A1 | 11/2018 | Kim |

\* cited by examiner

FUEL REACTANT LEAK DETECTION SYSTEM AND METHOD OF DETECTING FUEL REACTANT LEAKS

TECHNICAL FIELD

Embodiments relate to one or more one or more example vehicles, vehicle fuel reactant leak detection systems, computer program products, and computer implemented methods of detecting leakage of a fuel reactant from a vehicle when the vehicle is in a non-operating state.

BACKGROUND

In a vehicle having hydrogen ($H_2$) fuel cell system, the fuel supply valve (e.g., a solenoid valve), which is fluidically connected to the fuel supply source (e.g., a high-pressure hydrogen storage tank), generally operates between a closed operating state and an open operating state. During the closed operating state of the fuel supply valve, the vehicle engine is generally in a non-operating state. During the open operating state, the fuel supply valve facilitates flow of hydrogen fuel through the high-pressure fuel lines to the fuel cell(s). Also during the open operating state, pressure is reduced via one or more regulators to permit flow of hydrogen fuel to the fuel cell injectors.

The fuel supply valve can, due to debris or malfunction, remain unintentionally partially or fully open to thereby release hydrogen to an external environment outside of the vehicle. In which case, there is no mechanism to detect when the fuel supply valve is in an open state. In a situation in which the high-pressure fuel supply line downstream of the fuel supply valve is damaged or ruptured, hydrogen could leak, posing a serious safety hazard due to the possibility of the mixing of hydrogen (at certain concentrations) with ambient air (flammability hazard) or the displacement of ambient air (asphyxiation hazard) by hydrogen.

BRIEF SUMMARY

In accordance with one or more embodiments, one or more one or more example vehicles, vehicle fuel reactant leak detection systems, computer program products, and computer implemented methods of detecting leakage of a fuel reactant from a vehicle when the vehicle is in a non-operating state, such as for example, during a refueling sequence.

When a vehicle is in an operating state, the pressure in the fuel supply source (e.g., a high-pressure $H_2$ storage tank) is equal to the pressure at the high-pressure fuel supply line downstream of the fuel supply valve, and a fuel reactant (e.g., hydrogen) flows from the fuel supply source through the fuel supply valve and to the fuel cell module(s). A fuel supply valve (e.g., a solenoid valve) is then closed during a refueling sequence. Pressure increases in the fuel supply source but not the high-pressure fuel supply line downstream of the fuel supply valve, thereby creating a pressure differential therebetween. In case of a fuel supply valve leak or damage to the fuel supply valve, the fuel reactant will unintentionally flow through the fuel supply valve and pressurize the high-pressure fuel supply line.

In accordance with one or more embodiments, one or more pressure sensors, arranged at the downstream end of the high-pressure fuel supply line, will detect a change in pressure in the high-pressure fuel supply line resulting from the fuel supply valve leak or damage to the fuel supply valve. Given the high-pressure fuel supply line volume and the possible fuel reactant flows through the fuel supply valve, the time required for pressure in the high-pressure fuel supply line to increase to an amount that allows the one or more pressure sensors to detect the pressure increase within its tolerance is negligible when compared to the pressure increase rate in the fuel supply source when the vehicle is in a non-operating state, (e.g., during a refueling sequence). One or more embodiments set forth, described, and/or illustrated herein, therefore provides a valid procedure of dynamically detecting a faulty opening of the fuel supply valve, thereby significantly reducing the risk of an external leak of the fuel reactant.

In accordance with one or more embodiments, an example vehicle comprises one or more of the following: one or more fuel cell modules, a fuel supply source to supply a fuel reactant (e.g., hydrogen) to the one or more fuel cell modules via a high-pressure fuel supply line, a fuel supply valve configured to open and close fuel reactant flow through the high-pressure fuel supply line, and a vehicle fuel reactant leak detection system that includes a computing device, operatively connected to the fuel supply source, having one or more processors and a non-transitory memory operatively coupled to the one or more processors comprising a set of instructions executable by the one or more processors to cause the one or more processors to: conduct, in response to a detection as sensor data of pressure in the high-pressure fuel supply line when the vehicle engine is in a non-operating state (e.g., during a vehicle refueling sequence), fuel pressure analysis of the sensor data; and detect, based on the fuel pressure analysis, leakage of the fuel reactant at the fuel supply valve. Such leakage occurs as a result of a faulty opening of the fuel supply valve.

In accordance with one or more embodiments, an example a fuel reactant leak detection system for a vehicle having one or more fuel cell modules, a fuel supply source to supply a fuel reactant to the one or more fuel cell modules via a high-pressure fuel supply line, and a fuel supply valve configured to open and close fuel reactant flow through the high-pressure fuel supply line, the vehicle fuel reactant leak detection system comprising one or more of the following: a computing device, operatively connected to the fuel supply source, having one or more processors and a non-transitory memory operatively coupled to the one or more processors comprising a set of instructions executable by the one or more processors to cause the one or more processors to: conduct, in response to a detection as sensor data of pressure in the high-pressure fuel supply line when the vehicle engine is in a non-operating state (e.g., during a vehicle refueling sequence), fuel pressure analysis of the sensor data; and detect, based on the fuel pressure analysis, leakage of the fuel reactant at the fuel supply valve. Such leakage occurs as a result of a faulty opening of the fuel supply valve.

In accordance with one or more embodiments, a computer implemented method of detecting leakage of a fuel reactant from a vehicle having one or more fuel cell modules, a fuel supply source to supply a fuel reactant to the one or more fuel cell modules via a high-pressure fuel supply line, and a fuel supply valve configured to open and close fuel reactant flow through the high-pressure fuel supply line, the method comprising one or more of the following: conducting, in response to a detection as sensor data of pressure in the high-pressure fuel supply line when the vehicle engine is in a non-operating state (e.g., during a vehicle refueling sequence), fuel pressure analysis of the sensor data; and detecting, based on the fuel pressure analysis, leakage of the fuel reactant at the fuel supply valve. Such leakage occurs as a result of a faulty opening of the fuel supply valve.

In accordance with one or more embodiments, a computer implemented method of detecting leakage of a fuel reactant in a vehicle having one or more fuel cell modules, a fuel supply source to supply a fuel reactant to the one or more fuel cell modules via a high-pressure fuel supply line, and a fuel supply valve configured to open and close fuel reactant flow through the high-pressure fuel supply line, the method comprising one or more of the following: conducting, in response to a detection as sensor data of fuel pressure in the high-pressure fuel supply line when the vehicle engine is in a non-operating state, fuel pressure analysis of the sensor data; detecting, based on the fuel pressure analysis, leakage of the fuel reactant at the fuel supply valve; and causing, in response to the detected increase in pressure, transmission of one or more of an audio alert, a visual alert, and a haptic alert to an operator of the vehicle.

In accordance with one or more embodiments, a computer implemented method of detecting leakage of a fuel reactant in a vehicle having one or more fuel cell modules, a fuel supply source to supply a fuel reactant to the one or more fuel cell modules via a high-pressure fuel supply line, and a fuel supply valve configured to open and close fuel reactant flow through the high-pressure fuel supply line, the method comprising one or more of the following: dynamically detecting, as sensor data, fuel pressure in the high-pressure fuel supply line when the vehicle engine is in a non-operating state; conducting, in response to the detection, fuel pressure analysis of the sensor data; and detecting, based on the fuel pressure analysis, leakage of the fuel reactant at the fuel supply valve. Such leakage occurs as a result of a faulty opening of the fuel supply valve.

In accordance with one or more embodiments, a computer implemented method of detecting leakage of a fuel reactant in a vehicle having one or more fuel cell modules, a fuel supply source to supply a fuel reactant to the one or more fuel cell modules via a high-pressure fuel supply line, and a fuel supply valve configured to open and close fuel reactant flow through the high-pressure fuel supply line, the method comprising one or more of the following: dynamically detecting, as sensor data, fuel pressure in the high-pressure fuel supply line when the vehicle engine is in a non-operating state; conducting, in response to the detection, fuel pressure analysis of the sensor data; detecting, based on the fuel pressure analysis, leakage of the fuel reactant at the fuel supply valve; and causing, in response to the detected increase in pressure, transmission of one or more of an audio alert, a visual alert, and a haptic alert to an operator of the vehicle.

In accordance with each computer implemented method, detecting leakage of the fuel reactant at the fuel supply valve comprises detecting an increase in pressure at the high-pressure fuel supply line during the non-operating state of the vehicle that is indicative of a faulty opening of the fuel supply valve that may result in leakage of the fuel reactant.

In accordance with each computer implemented method, detecting leakage of the fuel reactant at the fuel supply valve comprises detecting the pressure in the high-pressure fuel supply line downstream of the fuel supply valve.

In accordance with each computer implemented method, detecting leakage of the fuel reactant at the fuel supply valve comprises detecting the pressure in the high-pressure fuel supply line between the one or more fuel cell modules and the fuel supply valve.

BRIEF DESCRIPTION OF THE SEVERAL VIEWS OF THE DRAWINGS

The various advantages of the one or more embodiments will become apparent to one skilled in the art by reading the following specification and appended claims, and by referencing the following drawings, in which:

DETAILED DESCRIPTION

Figure 1:
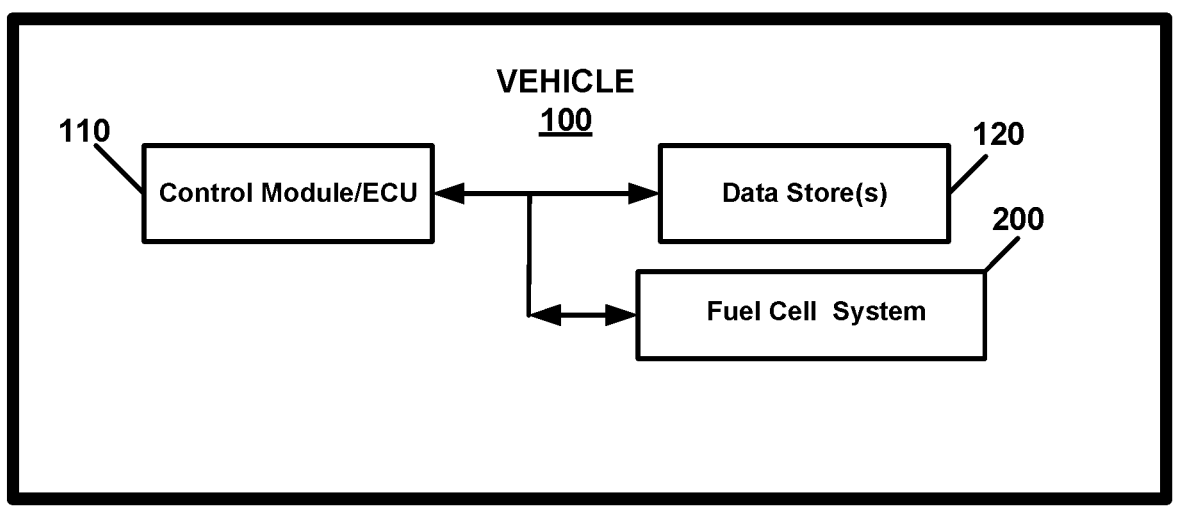
FIG. 1 illustrates a vehicle, in accordance with one or more embodiments set forth, described, and/or illustrated herein.

FIG. 1 illustrates an example vehicle 100 in accordance with one or more embodiments set forth, described, and/or illustrated herein. The example vehicle 100 may comprise a mobility-as-a-service (MaaS) vehicle, a car, a truck, a van, a sport utility vehicle, a bus, a robo-taxi, etc. Embodiments, however, are not limited thereto, and thus, this disclosure contemplates the vehicle 100 comprising any suitable vehicle that falls within the spirit and scope of the principles of this disclosure. For example, the vehicle 100 may comprise a marine vehicle, an air vehicle, or any other form of transport vehicle.

In one or more embodiments, the vehicle 100 may comprise one or more operational elements, some of which may be a part of an autonomous driving system. Some of the possible operational elements of the vehicle 100 are shown in FIG. 1 and will now be described. It will be understood that it is not necessary for the vehicle 100 to have all the elements illustrated in FIG. 1 and/or described herein. The vehicle 100 may have any combination of the various elements illustrated in FIG. 1. Moreover, the vehicle 100 may have additional elements to those illustrated in FIG. 1.

In one or more embodiments, the example vehicle 100 may not include one or more of the elements illustrated in FIG. 1. Moreover, while the various operational elements are illustrated as being located within the vehicle 100, embodiments are not limited thereto, and thus, one or more of the operational elements may be located external to the vehicle 100, and even physically separated by large spatial distances. The example vehicle 100 comprises a control module/electronic control unit (ECU) 110, one or more data stores 120, and a fuel cell system 200.

Figure 2:
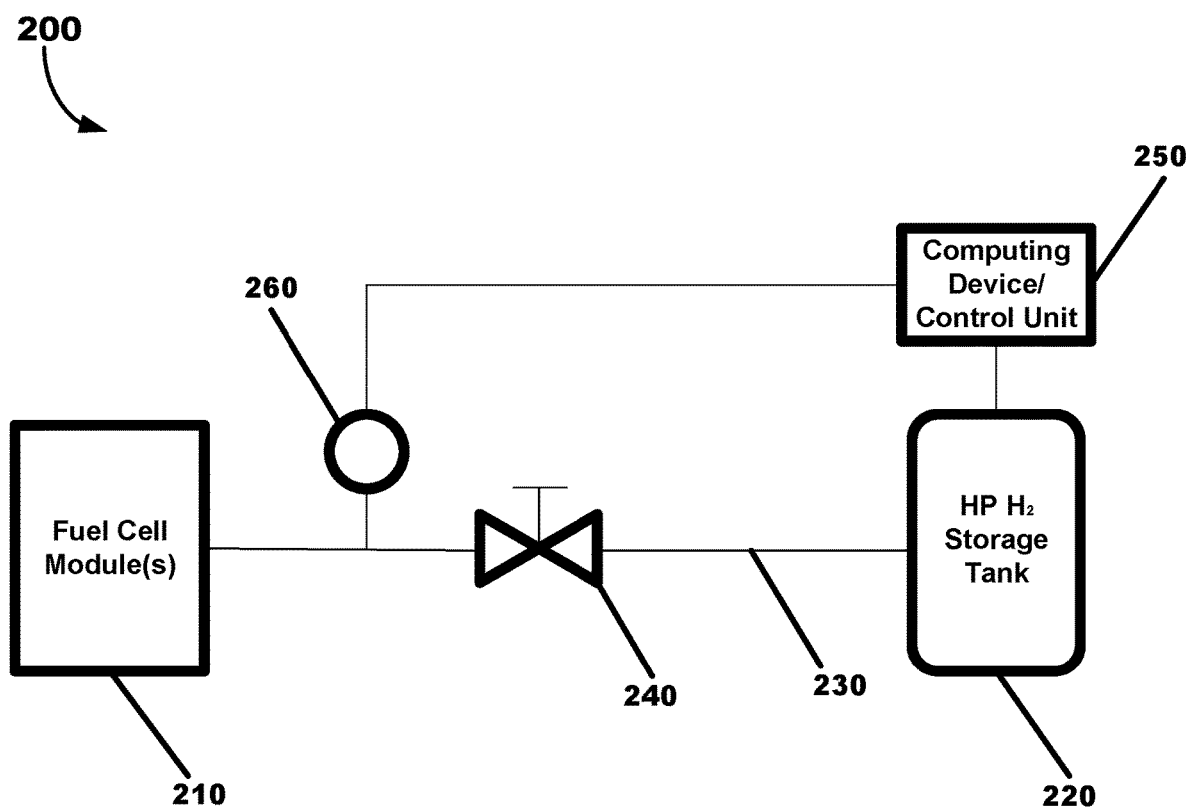
FIG. 2 illustrates a fuel cell system for the vehicle of FIG. 1.

As illustrated in FIG. 2, in one or more embodiments, the fuel cell system 200 comprises one or more fuel cell modules 210 fluidically connected to a fuel supply source 220 (e.g., a high-pressure hydrogen storage tank) to supply a fuel reactant (e.g., hydrogen) to the fuel cell modules 210 via a high-pressure fuel supply line 230, a fuel supply valve 240 configured to open and close fuel reactant flow through the high-pressure fuel supply line 230, a vehicle fuel reactant leak detection system that includes a control unit or computing device 250 that is operatively connected to the fuel supply source 220, and one or more pressure sensors 260 operatively connected to the computing device 250 and configured to detect pressure in the high-pressure fuel supply line 230.

In accordance with one or more embodiments set forth, described, and/or illustrated herein, the one or more fuel cell modules 210 may comprise a plurality of hydrogen fuel cells arranged in a stack formation to generate electric power (i.e., electric voltage or electric current) from an electrochemical reaction of a first fuel reactant comprising hydrogen ($H_2$) and a second fuel reactant comprising oxygen ($O_2$).

Figure 3:
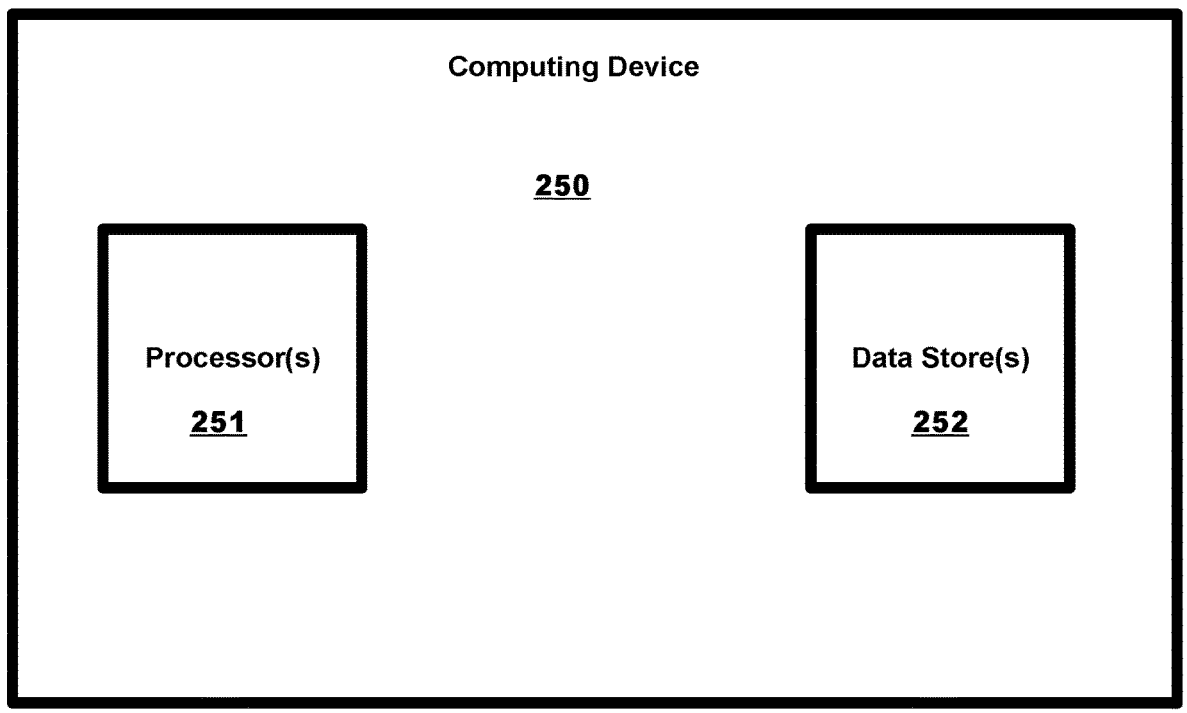
FIG. 3 illustrates a computing device for the fuel cell system of FIG. 2.

As illustrated in FIG. 3, the computing device 250 comprises one or more processors 251 and a non-transitory memory 252 operatively coupled to the one or more processors 251 comprising a set of instructions executable by the one or more processors 251 to cause the one or more processors 251 to conduct, in response to a detection as sensor data of pressure in the high-pressure fuel supply line 230 when the vehicle engine is in a non-operating state (e.g., during a vehicle refueling sequence), fuel pressure analysis of the sensor data. Based on the fuel pressure analysis, the one or more processors 251 are then caused to detect a faulty opening of the fuel supply valve 240 resulting in leakage of the fuel reactant.

In accordance with one or more embodiments set forth, described, and/or illustrated herein, "processor" means any component or group of components that are configured to execute any of the processes described herein or any form of instructions to carry out such processes or cause such processes to be performed. The one or more processors may be implemented with one or more general-purpose and/or one or more special-purpose processors. Examples of suitable processors include graphics processors, microprocessors, microcontrollers, DSP processors, and other circuitry that may execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The one or more processors may comprise at least one hardware circuit (e.g., an integrated circuit) configured to carry out instructions contained in program code. In embodiments in which there is a plurality of processors, such processors may work independently from each other, or one or more processors may work in combination with each other. In one or more embodiments, the one or more processors 251 may be a host, main, or primary processor of the fuel supply source 220.

The one or more data stores 252 are configured to store one or more types of data. The vehicle 100 may include interfaces that enable one or more systems thereof to manage, retrieve, modify, add, or delete, the data stored in the data stores 252. The one or more data stores 252 may comprise volatile and/or non-volatile memory. Examples of suitable data stores 252 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The one or more data stores 252 may be a component of the one or more processors 251, or alternatively, may be operatively connected to the one or more processors 251 for use thereby. As set forth, described, and/or illustrated herein, "operatively connected" may include direct or indirect connections, including connections without direct physical contact.

Figure 4:
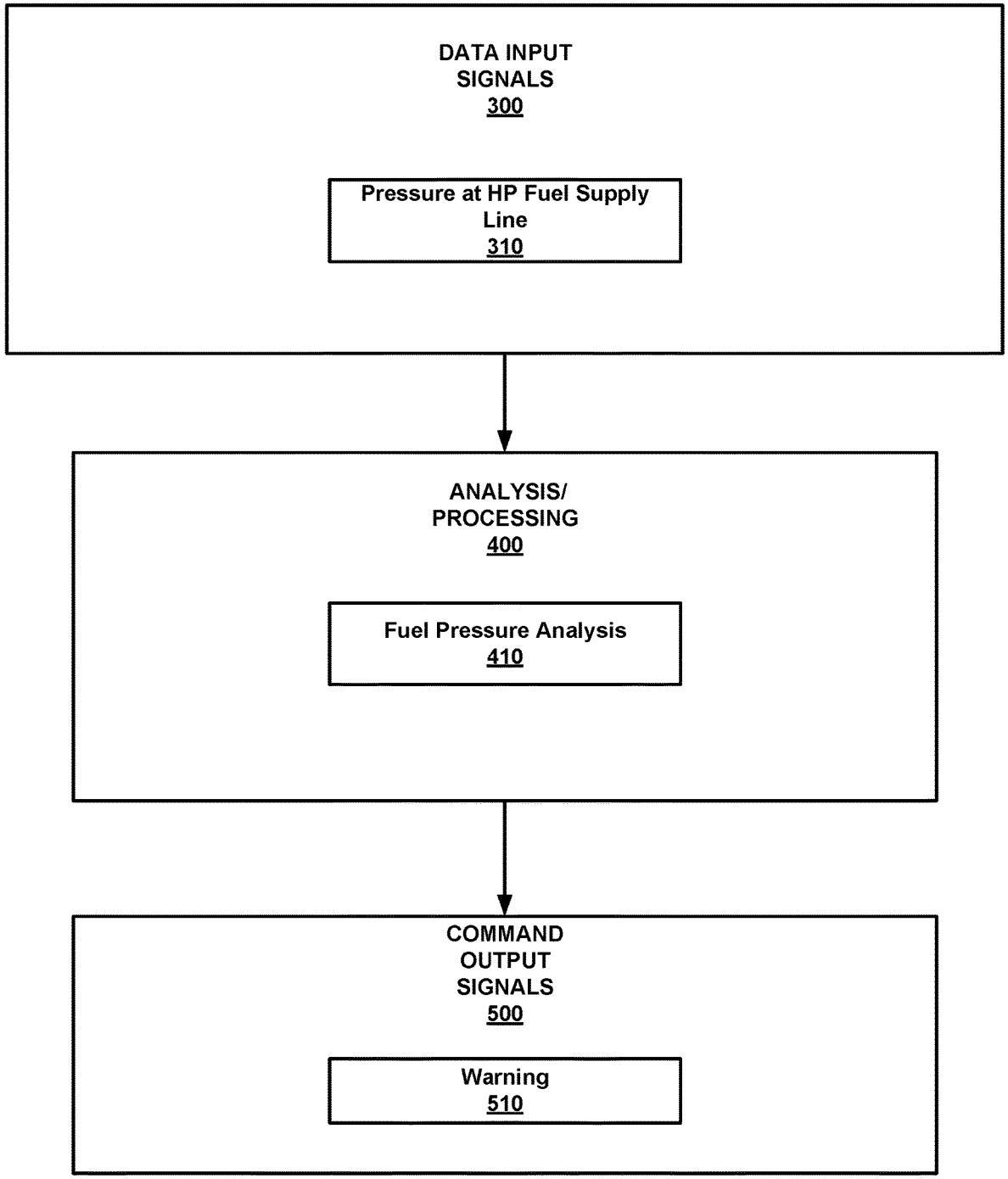
FIG. 4 illustrates a diagram of a vehicle system to detect fuel reactant leaks, in accordance with one or more embodiments set forth, described, and/or illustrated herein.

As illustrated in FIG. 4, in accordance with one or more embodiments set forth, described, and/or illustrated herein, the control the computing device 250 is configured to receive one or more data signals 300 as sensor data from the one or more pressure sensors 260 of pressure in the high-pressure fuel supply line 230 when the vehicle engine is placed in a non-operating state (e.g., ignition is off). In an example, the vehicle engine is placed in a non-operating state during a vehicle refueling sequence. In accordance with one or more embodiments set forth, described, and/or illustrated herein, the computing device 250 is configured to receive the one or more data input signals 300 via a wired or a wireless network interface. In one or more example embodiments, the computing device 250 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or a combination thereof. Embodiments, however, are not limited thereto, and thus, this disclosure contemplates any suitable other suitable wireless network architecture that permits practice of the one or more embodiments.

In response to receipt of the one or more data signals 300 the one or more processors 251 are to conduct an analysis 400, including, but not limited to, a fuel pressure analysis 410 of the sensor data, and then detect, based on the fuel pressure analysis, leakage of the fuel reactant at the fuel supply valve 240. The one or more processors 251 may be caused to detect an increase in pressure at the high-pressure fuel supply line 230 when the vehicle engine is placed in a non-operating state that is indicative of leakage of the fuel reactant. The detection of a pressure increase is indicative of a faulty opening of the fuel supply valve 240 that may result in leakage of the fuel reactant.

In accordance with one or more embodiments set forth, described, and/or illustrated herein, in response to a detection of an increase in pressure at the high-pressure fuel supply line 230, the one or more processors 251 are caused to execute the set of instructions by transmitting one or more command output signals 500 to the vehicle ECU 110 in order to warn of such a pressure increase. The warning command output signal 510 may comprise one or more of an audio alert, a visual alert, and a haptic alert to an operator of the vehicle. The warning command output signal 510 may be based on, for example, a detected pressure being outside of a recommended pressure range. Such an alert may be presented on an output interface. As used herein, an output interface is any device, component, system, subsystem, element, or arrangement or groups thereof that enable information/data to be presented to a vehicle occupant and/or remote operator of the vehicle 100. The output interface may be configured to present information/data to the vehicle occupant and/or the remote operator. The output interface may comprise one or more of a visual display or an audio display such as a microphone, earphone, and/or speaker. One or more components of the vehicle 100 may serve as both a component of the input interface and a component of the output interface.

In accordance with one or more embodiments set forth, described, and/or illustrated herein, the one or more pressure sensors 260 are configured to detect, capture, determine, assess, monitor, measure, quantify, and/or sense the pressure in the high-pressure fuel supply line 230. In particular, the one or more pressure sensors 260 are configured to detect pressure in the high-pressure fuel supply line 230 at a region of the high-pressure fuel supply line 230 located downstream of the fuel supply valve 240, i.e., at a region between the fuel cell module(s) 210 and the fuel supply valve 240. As set forth, described, and/or illustrated herein, "sensor" means any device, component, system, and/or subsystem that can perform one or more of detecting, determining, assessing, monitoring, measuring, quantifying, and sensing something. The one or more sensors may be configured to detect, determine, assess, monitor, measure, quantify and/or sense in real-time. As set forth, described, and/or illustrated herein, "real-time" means a level of processing responsiveness that a user, system, or subsystem senses as sufficiently immediate for a particular process or determination to be made, or that enables the processor to keep up with some external process.

In accordance with one or more embodiments set forth, described, and/or illustrated herein, the one or more pressure sensors 260 may be spatially arranged in an array configuration physically on, in close proximity, or otherwise adjacent to the high-pressure fuel supply line 230 to facilitate the detection of pressure. The one or more pressure sensors 260 may be used in any combination, and may be used redundantly to validate and enhance the accuracy of the detection. The one or more pressure sensors 260 may be fixed in a position that does not change relative to the high-pressure fuel supply line 230. Alternatively or additionally, the one or more pressure sensors 260 may be manually or automatically moveable so as to change position relative to the high-pressure fuel supply line 230 in a manner which facilitates the detection of pressure from different regions of the high-pressure fuel supply line 230. The one or more pressure sensors 260 (and/or the movement thereof) may be selectively controlled by the computing device 250.

In one or more embodiments, the detected pressure sensor data is stored in the one or more data stores 252 of the computing device 250. Alternatively or additionally, the captured image data and the captured olfactory data is stored in the one or more data stores 120 of the control module/ECU 120.

Figure 5:
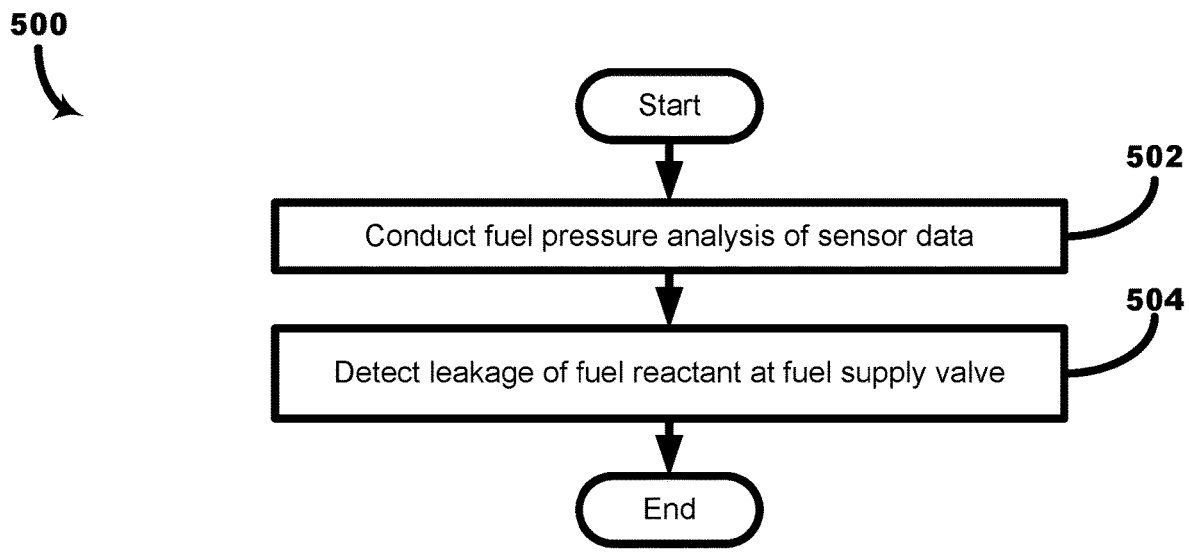
FIGS. 5 through 8 respectively illustrate a flowchart of a computer implemented method of detecting leakage of a fuel reactant in a vehicle, in accordance with one or more embodiments set forth, described, and/or illustrated herein.
Figure 6:
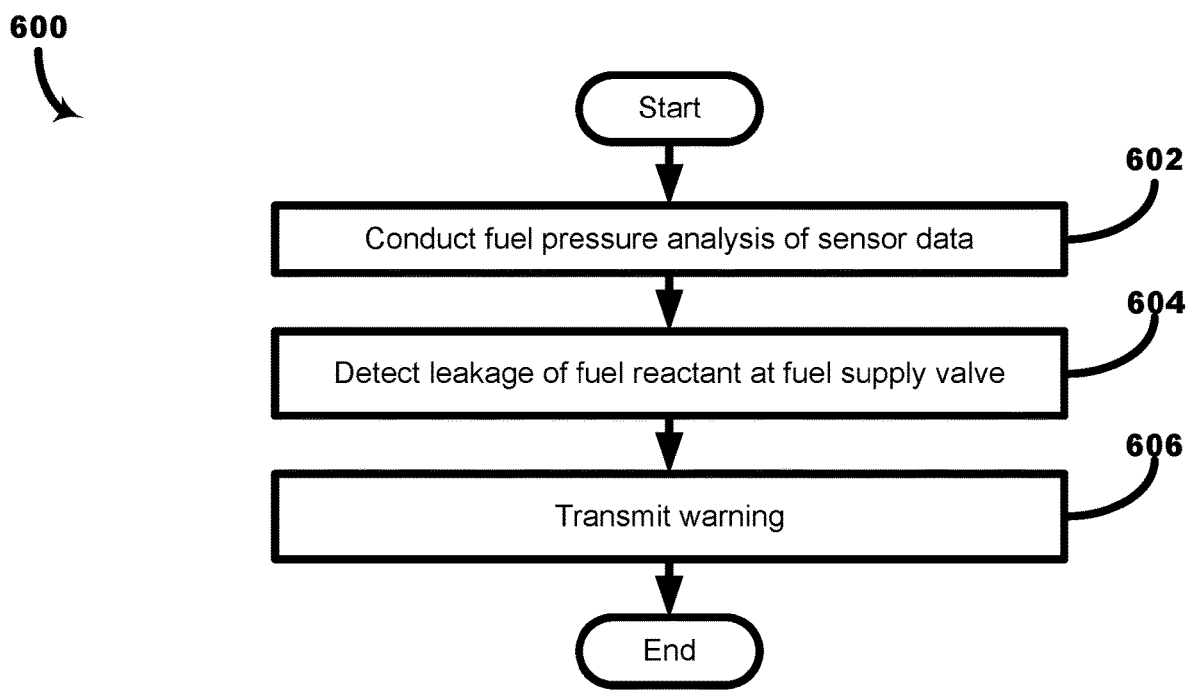
Figure 7:
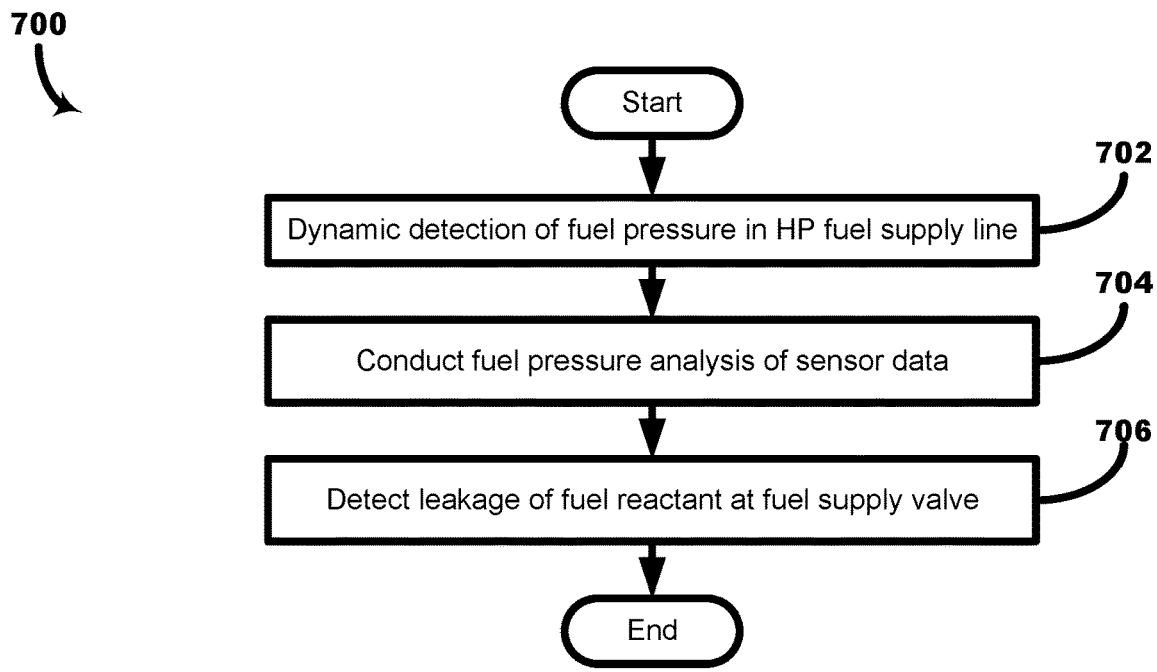

In the illustrated examples of FIGS. 5 to 7, a flowchart of computer implemented methods 500, 600, 700, and 800 of detecting leakage of a fuel reactant from a vehicle. In one or more examples, the respective flowcharts of the methods 500, 600, 700, and 800 may be implemented by the one or more processors 251 of the computing device 250. In particular, the computer implemented methods 500, 600, 700, and 800 may be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

In one or more examples, software executed by the computing device 250 provides functionality described or illustrated herein. In particular, software executed by the one or more processors 251 is configured to perform one or more processing blocks of the computer implemented methods 500, 600, 700, and 800 set forth, described, and/or illustrated herein, or provides functionality set forth, described, and/or illustrated.

In the illustrated example of FIG. 5, illustrated process block 502 includes conducting, in response to a detection as sensor data of fuel pressure in the high-pressure fuel supply line when the vehicle engine is in a non-operating state, fuel pressure analysis of the sensor data.

The computer implemented method 500 may then proceed to illustrated process block 504, which includes detecting, based on the fuel pressure analysis, leakage of the fuel reactant at the fuel supply valve.

In accordance with the computer implemented method 500, detecting leakage of the fuel reactant at the fuel supply valve comprises detecting an increase in pressure at the high-pressure fuel supply line during the non-operating state of the vehicle that is indicative of leakage of the fuel reactant.

In accordance with the computer implemented method 500, detecting leakage of the fuel reactant at the fuel supply valve comprises detecting the pressure in the high-pressure fuel supply line downstream of the fuel supply valve.

In accordance with the computer implemented method 500, detecting leakage of the fuel reactant at the fuel supply valve comprises detecting the pressure in the high-pressure fuel supply line between the one or more fuel cell modules and the fuel supply valve.

The computer implemented method 500 can terminate or end after completion of illustrated process block 504.

In the illustrated example of FIG. 6, illustrated process block 602 includes conducting, in response to a detection as sensor data of fuel pressure in the high-pressure fuel supply line when the vehicle engine is in a non-operating state, fuel pressure analysis of the sensor data.

The computer implemented method 600 may then proceed to illustrated process block 604, which includes detecting, based on the fuel pressure analysis, leakage of the fuel reactant at the fuel supply valve.

In accordance with the computer implemented method 600, detecting leakage of the fuel reactant at the fuel supply valve comprises detecting an increase in pressure at the high-pressure fuel supply line during the non-operating state of the vehicle that is indicative of leakage of the fuel reactant.

In accordance with the computer implemented method 600, detecting leakage of the fuel reactant at the fuel supply valve comprises detecting the pressure in the high-pressure fuel supply line downstream of the fuel supply valve.

In accordance with the computer implemented method 600, detecting leakage of the fuel reactant at the fuel supply valve comprises detecting the pressure in the high-pressure fuel supply line between the one or more fuel cell modules and the fuel supply valve.

The computer implemented method 600 may then proceed to illustrated process block 606, which includes causing, in response to the detected increase in pressure, transmission of one or more of an audio alert, a visual alert, and a haptic alert to an operator of the vehicle. The computer implemented method 600 can terminate or end after completion of illustrated process block 604.

In the illustrated example of FIG. 7, illustrated process block 702 includes dynamically detecting, as sensor data, fuel pressure in the high-pressure fuel supply line when the vehicle engine is in a non-operating state.

The computer implemented method 700 may then proceed to illustrated process block 704, which includes conducting, in response to the detection, fuel pressure analysis of the sensor data.

The computer implemented method 700 may then proceed to illustrated process block 706, which includes detecting, based on the fuel pressure analysis, leakage of the fuel reactant at the fuel supply valve.

In accordance with the computer implemented method 700, detecting leakage of the fuel reactant at the fuel supply valve comprises detecting an increase in pressure at the high-pressure fuel supply line during the non-operating state of the vehicle that is indicative of leakage of the fuel reactant.

In accordance with the computer implemented method 700, detecting leakage of the fuel reactant at the fuel supply valve comprises detecting the pressure in the high-pressure fuel supply line downstream of the fuel supply valve.

In accordance with the computer implemented method 700, detecting leakage of the fuel reactant at the fuel supply valve comprises detecting the pressure in the high-pressure fuel supply line between the one or more fuel cell modules and the fuel supply valve.

The computer implemented method 700 can terminate or end after completion of illustrated process block 706.

Figure 8:
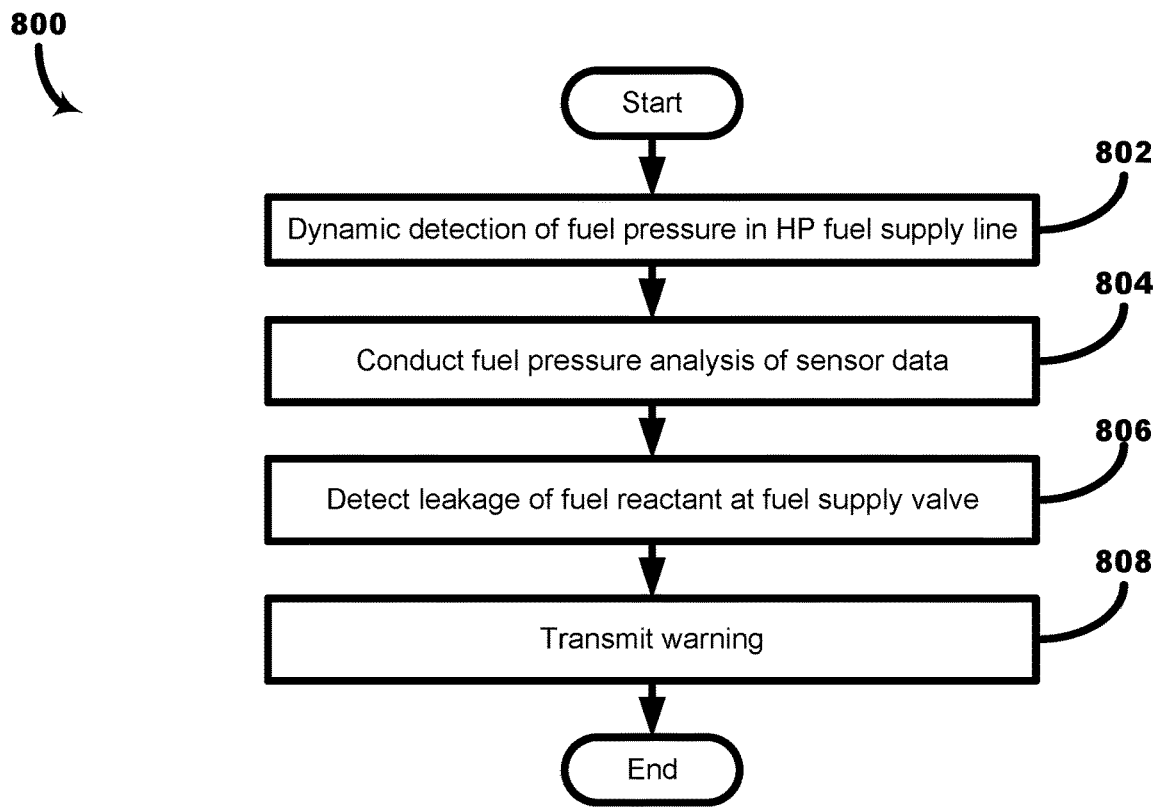

In the illustrated example of FIG. 8, illustrated process block 802 includes dynamically detecting, as sensor data, fuel pressure in the high-pressure fuel supply line when the vehicle engine is in a non-operating state.

The computer implemented method 800 may then proceed to illustrated process block 804, which includes conducting, in response to the detection, fuel pressure analysis of the sensor data.

The computer implemented method 800 may then proceed to illustrated process block 806, which includes detecting, based on the fuel pressure analysis, leakage of the fuel reactant at the fuel supply valve.

In accordance with the computer implemented method 800, detecting leakage of the fuel reactant at the fuel supply valve comprises detecting an increase in pressure at the high-pressure fuel supply line during the non-operating state of the vehicle that is indicative of leakage of the fuel reactant.

In accordance with the computer implemented method 800, detecting leakage of the fuel reactant at the fuel supply valve comprises detecting the pressure in the high-pressure fuel supply line downstream of the fuel supply valve.

In accordance with the computer implemented method 800, detecting leakage of the fuel reactant at the fuel supply valve comprises detecting the pressure in the high-pressure fuel supply line between the one or more fuel cell modules and the fuel supply valve.

The computer implemented method 800 may then proceed to illustrated process block 808, which includes causing, in response to the detected increase in pressure, transmission of one or more of an audio alert, a visual alert, and a haptic alert to an operator of the vehicle. The computer implemented method 800 can terminate or end after completion of illustrated process block 808.

The terms "coupled," "attached," or "connected" may be used herein to refer to any type of relationship, direct or indirect, between the components in question, and may apply to electrical, mechanical, fluid, optical, electromagnetic, electromechanical or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A vehicle, comprising:
one or more fuel cell modules;
a fuel supply source to supply a fuel reactant to the one or more fuel cell modules via a high-pressure fuel supply line, wherein the fuel supply source is to supply the fuel reactant to the one or more fuel cell modules at a pressure substantially the same as a pressure at the fuel supply source;
a fuel supply valve configured to open and close fuel reactant flow through the high-pressure fuel supply line;
one or more pressure sensors, operatively connected to a computing device, and configured to detect pressure in the high-pressure fuel supply line downstream of the fuel supply valve at a region between the one or more fuel cell modules and the fuel supply valve; and
a vehicle fuel reactant leak detection system that includes the computing device, operatively connected to the fuel supply source, the computing device having one or more processors and a non-transitory memory operatively coupled to the one or more processors comprising a set of instructions executable by the one or more processors to cause the one or more processors to:
conduct, in response to a detection as sensor data of pressure in the high-pressure fuel supply line when the vehicle engine is in a non-operating state, fuel pressure analysis of the sensor data; and
detect, based on the fuel pressure analysis, leakage of the fuel reactant at the fuel supply valve.

2. The vehicle of claim 1, wherein the set of instructions, when executed by the one or more processors, cause the one or more processors to detect an increase in pressure at the high-pressure fuel supply line during the non-operating state of the vehicle that is indicative of a faulty opening of the fuel supply valve that results in leakage of the fuel reactant.

3. The vehicle of claim 2, wherein the set of instructions, when executed by the one or more processors, cause, in response to the detected increase in pressure, transmission of one or more of an audio alert, a visual alert, and a haptic alert to an operator of the vehicle.

4. The vehicle of claim 1, wherein the fuel reactant comprises hydrogen.

5. A fuel reactant leak detection system for a vehicle having one or more fuel cell modules, a fuel supply source to supply a fuel reactant to the one or more fuel cell modules via a high-pressure fuel supply line, wherein the fuel supply source is to supply the fuel reactant to the one or more fuel cell modules at a pressure substantially the same as a pressure at the fuel supply source, a fuel supply valve configured to open and close fuel reactant flow through the high-pressure fuel supply line, and one or more pressure sensors, operatively connected to a computing device, and configured to detect pressure in the high-pressure fuel supply line downstream of the fuel supply valve at a region between the one or more fuel cell modules and the fuel supply valve, the vehicle fuel reactant leak detection system comprising:
the computing device, operatively connected to the fuel supply source, having one or more processors and a non-transitory memory operatively coupled to the one or more processors comprising a set of instructions executable by the one or more processors to cause the one or more processors to:

conduct, in response to a detection as sensor data of pressure in the high-pressure fuel supply line when the vehicle engine is in a non-operating state, fuel pressure analysis of the sensor data; and detect, based on the fuel pressure analysis, leakage of the fuel reactant at the fuel supply valve.

6. The fuel reactant leak detection system of claim 5, wherein the set of instructions, when executed by the one or more processors, cause the one or more processors to detect an increase in pressure at the high-pressure fuel supply line during the non-operating state of the vehicle that is indicative of a faulty opening of the fuel supply valve that results in leakage of the fuel reactant.

7. The fuel reactant leak detection system of claim 6, wherein the set of instructions, when executed by the one or more processors, cause, in response to the detected increase in pressure, transmission of one or more of an audio alert, a visual alert, and a haptic alert to an operator of the vehicle.

8. The fuel reactant leak detection system of claim 5, wherein the fuel reactant comprises hydrogen.

9. A computer implemented method of detecting leakage of a fuel reactant from a vehicle having one or more fuel cell modules, a fuel supply source to supply a fuel reactant to the one or more fuel cell modules via a high-pressure fuel supply line, wherein the fuel supply source is to supply the fuel reactant to the one or more fuel cell modules at a pressure substantially the same as a pressure at the fuel supply source, a fuel supply valve configured to open and close fuel reactant flow through the high-pressure fuel supply line, and one or more pressure sensors, operatively connected to a computing device, and configured to detect pressure in the high-pressure fuel supply line at a region between the one or more fuel cell modules and the fuel supply valve, the method comprising:

conducting, in response to a detection as sensor data of pressure in the high-pressure fuel supply line when the vehicle engine is in a non-operating state, fuel pressure analysis of the sensor data; and detecting, based on the fuel pressure analysis, leakage of the fuel reactant at the fuel supply valve, wherein detecting leakage of the fuel reactant at the fuel supply valve comprises detecting the pressure in the high-pressure fuel supply line downstream of the fuel supply valve.

10. The computer implemented method of claim 9, wherein detecting leakage of the fuel reactant at the fuel supply valve comprises detecting an increase in pressure at the high-pressure fuel supply line during the non-operating state of the vehicle that is indicative of a faulty opening of the fuel supply valve that results in leakage of the fuel reactant.

11. The computer implemented method of claim 10, further comprising, in response to the detected increase in pressure, causing transmission of one or more of an audio alert, a visual alert, and a haptic alert to an operator of the vehicle.

12. The computer implemented method of claim 9, wherein the fuel reactant comprises hydrogen.

* * * * *